# United States Patent [19]

Johncock

[11] Patent Number: 5,321,308
[45] Date of Patent: Jun. 14, 1994

[54] CONTROL METHOD AND APPARATUS FOR A TURBINE GENERATOR

[75] Inventor: Allan W. Johncock, League City, Tex.

[73] Assignee: Tri-Sen Systems Inc., La Marque, Tex.

[21] Appl. No.: 91,769

[22] Filed: Jul. 14, 1993

[51] Int. Cl.⁵ ............................ H02P 9/00; H02P 9/10
[52] U.S. Cl. .................................. 290/40 C; 290/52; 322/34
[58] Field of Search ................ 290/40 R, 40 C, 52; 310/68 C; 361/24; 322/34

[56] References Cited

U.S. PATENT DOCUMENTS 4,029,951 6/1977 Berry et al. .................. 290/40 R
4,674,279 6/1987 Ali et al. ........................ 290/52

Primary Examiner—A. D. Pellinen
Assistant Examiner—Robert Lloyd Hoover
Attorney, Agent, or Firm—Browning, Bushman, Anderson & Brookhart

[57] ABSTRACT

A control method and apparatus for a gas turbine generator is disclosed having multiple modes of operation dependent on generator output components including real power generated, reactive power generated, and power factor. The apparatus provides for selecting a high priority output component, a low priority output component, and a variable output component. Depending on the priority selected, stator temperature is controlled with either a var limiter controller or a MW limiter controller. Rotor temperature is controlled by limiting excitation current substantially independently of priority selection. Setpoint selection may be variable and includes desired MW, MVAR's, and Power factor. This invention allows control of the generator to produce the maximum MVAR's the generator is capable of producing while at the same time utilizing the remainder of the gas turbine output capability for MW generation.

23 Claims, 6 Drawing Sheets

| MODE | PRIORITY | | VARIES | MW LIMIT | VAR LIMIT CONTROLLER |
|---|---|---|---|---|---|
| | HIGH | LOW | | | |
| 1 | PF | MW | MVAR | ON | OFF |
| 2 | MVAR | MW | PF | ON | OFF |
| 3 | MW | PF | MVAR | ON | ON |
| 4 | MW | MVAR | PF | ON | ON |

FIG. 7.

CONTROL METHOD AND APPARATUS FOR A TURBINE GENERATOR

BACKGROUND OF THE INVENTION

1. Field of the Invention

The present invention relates to gas turbine generators and, more specifically, to a unique control system for multiple mode regulation based on output priorities to optimize turbine generator operation.

2. Description of the Background

Collectively, turbines are used to drive over 95% of the electrical generating capacity in the world. Turbines may be driven by a variety of fluids. Commonly used fluids for driving turbines include steam raised in fossil fuel-fired boilers and hot air or combustion products.

In a synchronous generator plant, the turbine drives a synchronous generator that consists of a three phase stator winding and a wound rotor which carries DC excitation current to produce a rotating magnetic field. If the generator is isolated from the power grid, then the excitation current controls the voltage generated in the stator windings.

If the generator is connected to a power grid, the excitation current is used to regulate the power factor or reactive power generated. The grid voltage is a function of the net excitation of all the connected generators. A single generating unit may have little ability to influence grid voltage. In such cases, increasing the excitation above that required for matching the generator voltage to the grid voltage produces a lagging power factor. Decreasing the excitation below that required for voltage matching produces a leading power factor.

At least two general types of exciters are commonly used to provide excitation current for the rotor. Older rotating exciters consist of a DC generator connected directly to the main rotor for rotation with it. Commutation brushes may be used to supply DC current to the main rotor slip rings. Later rotating exciters are of an alternator style employing rectifiers. A voltage regulator is used with the rotating exciter to supply the exciter field current and thereby control the generator output.

Static exciters include high output SCR rectifiers that provide all the excitation required by the main rotor. These SCR rectifiers are supplied from a step down transformer on the output of the main generator. In this case, the voltage regulator signal determines the firing time of the SCR's and thereby controls the rotor excitation current.

The voltage regulator controls the generator excitation to achieve the voltage, MVAR's (mega-volt-amperes of reactive power), or PF (power factor) desired by the operator. In the past, voltage regulators may be provided with options to control voltage, PF, and MVAR's and to limit minimum and maximum excitation to protect both the exciter and generator from damage.

For power management purposes it is often desirable to over-excite the generator to produce MVAR's required by local loads. Thus, the reactive component of the local load is generated locally and does not have to be supplied through long power transmission lines, with high losses, from a remotely located main generating plant.

Substantial problems arise in generating power locally with respect to local generation of reactive loads. For instance, low power factors used to optimize MVAR output tend to cause overloading of the generators. This is because MVAR production creates large reactive currents which may damage stator or rotor windings even though MVAR production does not consume horsepower. Thus, the turbine may overload the generator relatively easily when operating in this mode. In a peaking turbine mode, it is often desirable to generate maximum MVAR's up to the limit of the generator. There is, at the same time, substantial economic incentive to utilize full gas turbine output because at this time the turbine operates at its highest efficiency. Load changes may also require significant changes in operation modes to optimize combinations of real and reactive power output. Generator capabilities may differ from anticipated ranges of operation for the generator due to many factors such as cooling efficiency, ventilation, and the like. Generator and turbine capacity will also vary significantly depending on ambient temperature conditions. For instance, if ambient temperatures are very low, increased turbine capability at low temperatures may result in overloading the generator when the gas turbine is operated for peak loading.

Thus, there has been a long felt need to economically solve the problems of efficient generation of power including those associated with locally generated reactive power output. Those persons skilled in the art will appreciate the present invention that significantly alleviates these and other problems.

SUMMARY OF THE INVENTION

An object of the present invention is to provide an improved turbine generator control.

Another object of the present invention is a control system incorporating multiple modes of operation through selection of priorities and targets.

A feature of the present invention is a means for protecting the generator from stator over-temperature while still maintaining, as far as possible, selected priorities and targets.

Another feature of the present invention is a means for protecting the generator from rotor over-temperature that seeks the best compromise with selected priorities and targets.

An advantage of the present invention is a highly efficient mode of operation for peaking gas turbine applications so as to produce maximum MVAR production within the capability of the turbine generator.

Another advantage of the present invention is independent control of stator and rotor temperature.

The present invention comprises a control apparatus for a turbine generator including a priority selection means for selecting a high priority output component, a low priority output component, and a variable output component. The output components include the real power generated, power factor, and reactive power generated. Setpoint selection means are provided for selecting a target for the high priority component and also for the low priority component. A generator rotor is provided for producing a rotating magnetic field. A field current controller provides field current which flows in the rotating exciter coil. A turbine control means is used to control turbine horsepower and is responsive to the priority selection means and the setpoint selection means.

Thus, the present invention controls the turbine generator by selecting an operation mode for the turbine generator which is generally determined by priorities including the high priority output component, low priority output component, and the variable output component.

Preferably three setpoints are input; one for MW (a turbine control function); one for MVAR's (an excitation control function); and one for PF (also an excitation control function). The system will then meet the target setpoints according to the mode selected. Thus, an output setpoint, which may include a target range or a target dependent on another variable quantity, is selected for the high priority output component and the low priority output component. While the high and low priority components are independently controlled, the variable output component is allowed to vary or float. This method achieves the high and low priority output components if this combination of setpoints is within the capability of the turbine generator. If not, the low priority output component is varied to produce the high priority output setpoint. If the high priority setpoint is not within the capability of the turbine generator, then the high priority output component is adjusted to protect the turbine generator.

Other objects, features and intended advantages of the invention will be more readily apparent by reference to the following detailed description in connection with the accompanying drawings.

BRIEF DESCRIPTION OF THE DRAWINGS

FIG. 7 is an operation mode chart showing several operation modes of a control system in accord with the present invention;

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

Figure 1:
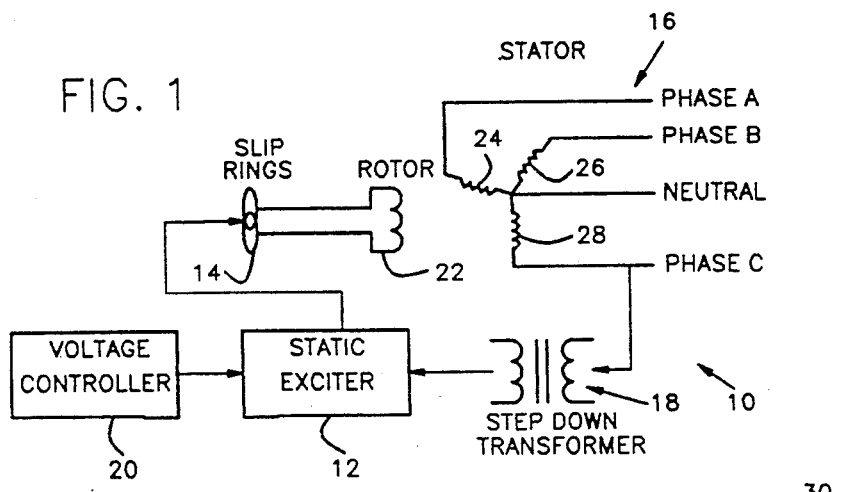
FIG. 1 is a schematic representation of a generator having a static exciter in accord with the present invention.

Referring now to the drawings and more specifically to FIG. 1, there is schematically shown generator 10 which may be controlled using the turbine generator control apparatus and method of the present invention. Generator 10 employs a static exciter 12 which supplies D.C. current to slip rings 14. Static exciter 12 employs SCR's to rectify the output from stator 16 through step-down transformer 18. Voltage controller 20 regulates the output of static exciter 12 by controlling the firing angle of the SCR's to increase or decrease D.C. current output as required by power demand inputs, discussed hereinafter, to voltage controller 20. The present invention is adaptable to produce control signals to static exciters as illustrated and to rotating exciters (not shown) which may be of several types.

Rotor 22 is fed D.C. current through slip rings 14 as rotor 22 is rotated to produce a rotating magnetic field or rotating magnetic flux. As the rotating magnetic flux cuts through stator windings 24, 26, and 28, voltage is induced in each winding to produce three phase power in a manner well known to those skilled in the art. Varying the D.C. current through slip rings 14 thereby varies the rotating magnetic flux to thereby control the generator output.

Figure 2:
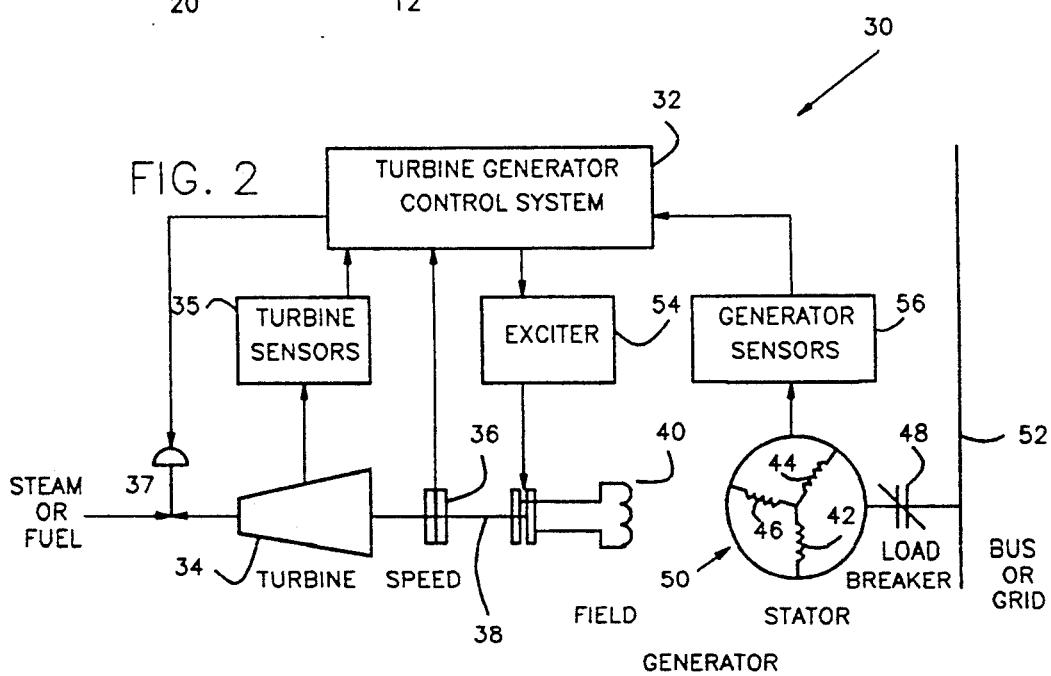
FIG. 2 is a schematic representation of a turbine generator with control system.

FIG. 2 schematically discloses basic elements of turbine generator 30 with control system 32 in accord with the present invention. Control system 32 regulates or modulates flow of steam to a steam turbine or fuel to gas turbine 34 through valve 37. Turbine sensors 35 for control of the turbine may include various transducers such as but not limited to temperature sensors, valve status sensors, pressure sensors, valve-gear transducers, flow transducers, and so forth. Other sensors are also used as discussed hereinafter in operation of the system. Speed sensor 36, which may be of the magnetic pulse type, is used by turbine generator control system 32 with other turbine sensor information to provide speed/load control in a manner known by those skilled in the art.

Turbine shaft 38 rotates rotor 40 to produce a rotating magnetic field with magnetic flux that cuts conductors forming stator coils 42, 44, and 46 to produce three phase power. Load breaker 48 connects, either automatically or manually, generator 50 to a bus or grid 52 after a start-up sequence of the generator occurs. Load breaker 48 will also disconnect generator 50 from the bus or grid 52 as required for servicing, load requirements, faults, or other purposes. Bus or grid 52 may be a power grid or part of a distribution network containing remotely generated power, an isolated bus for locally generated power not connected to a power grid, or a bus between several local turbine generators that may or may not be connected to a power grid.

Generator 50 is preferably a synchronous type of generator that synchronizes to grid frequency. As such, once load breaker 48 is closed, generator 50 is locked electrically to grid 52 and the grid frequency thereof. Prior to breaker 48 closing, turbine generator control system 32 can control frequency through turbine 34 but after the breaker is closed, the turbine generator is locked to the grid and cannot change frequency. Furthermore, if fuel through valve 36 is reduced to zero, generator 50 will act as a motor and pull the turbine thereby consuming energy from grid 52. If fuel is applied through valve 37 above the breakeven point of operation, generator 50 will effectively push against grid 52 and produce power. The harder turbine 34 pushes, the more megawatts are produced. The energy supplied by the fuel expended equals the megawatts generated plus turbine and generator losses.

Turbine control system 32 regulates DC current to rotor 40 through exciter 54 in response to feedback from generator sensors 56. Turbine control system 32 thus operates using numerous transducers and actuators. Turbine control system 32 and its connections to the turbine generator may comprise electrical, mechanical, hydraulic, and digital components. Turbine control system 32 of the present invention is preferably implemented, so far as possible, using software operation of a computerized system and therefore includes analog-to-digital and digital-to-analog components to manipulate the signals involved in digital format.

The control system could also be provided in a substantially hard-wired format comprising electronic, electro-mechanical, and hydraulic components. However, software is typically more flexible and easily reconfigured to provide a desired operation or to add a new operation. Software is often less expensive. Thus, software is preferably used to perform control functions where possible.

Figure 3:
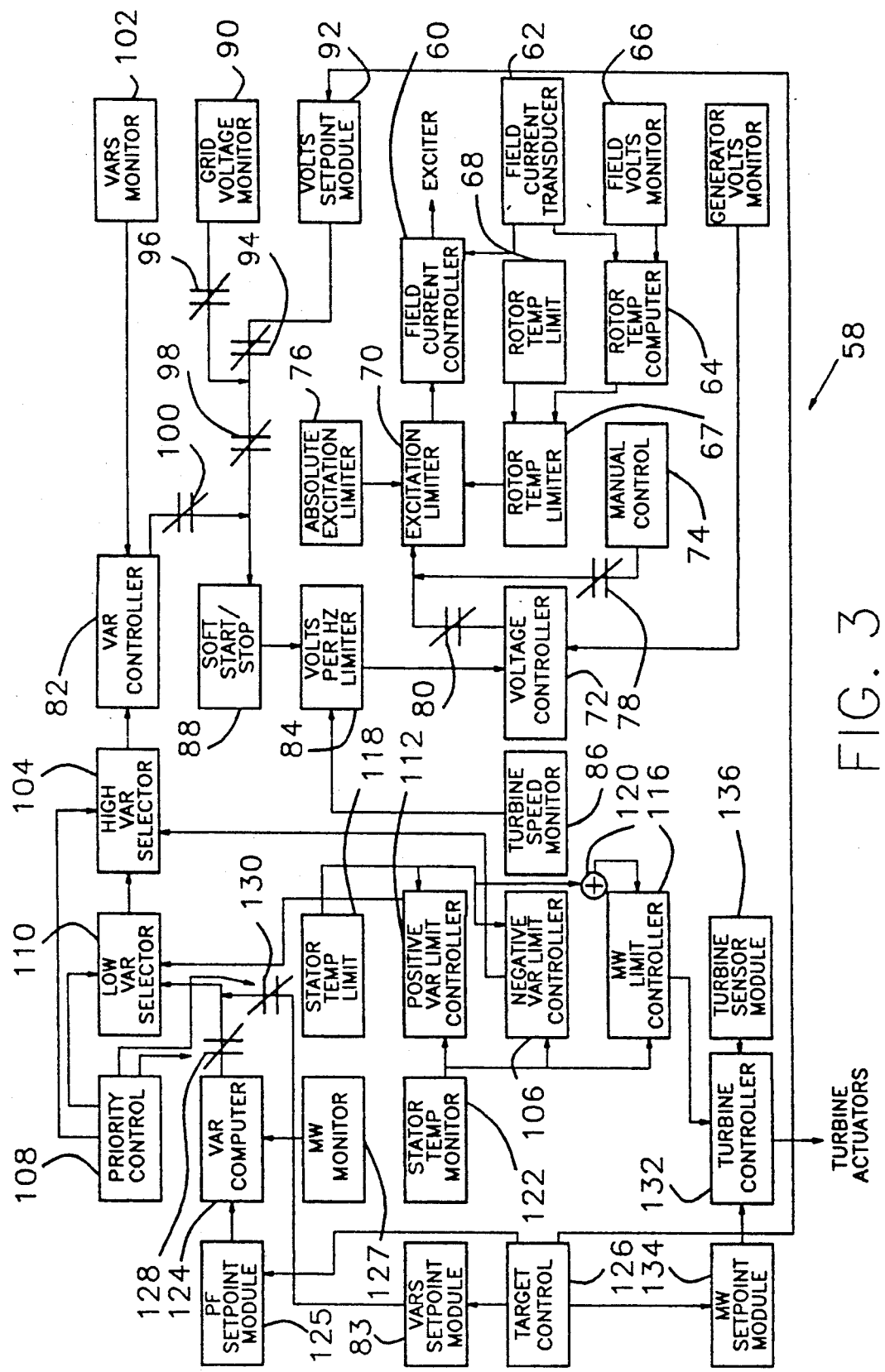
FIG. 3 is a schematic representation of a turbine generator control system.

FIG. 3 is a schematic representation of a turbine generator control 58 in accord with the present invention shown in block diagram format. Field current controller 60 provides a control signal to an exciter, such as static exciter 12 shown in FIG. 1, for controlling the field current through the generator rotor. Field current controller has a setpoint or target current which it attempts to maintain as compared to a feedback signal. A field current signal from field current transducer 62 is applied to field current controller 60 to provide feedback concerning the field current. Field current transducer 62 may consist of a voltage signal developed across a resistor in series with the field current or other means to monitor field current. The output of field current controller 60 will typically be an analog signal and can be configured to operate a variety of exciters.

Field current controller 60 and other modules or components of the control system may process signals such as monitored signals, setpoint or target signals, added error signals, or other signals applied to them. These signals are processed to produce proportional, integral, and derivative output signals in various sequences in a manner well known in the art for control systems.

For instance, in a PIP controller (proportional/integral/proportional) there is a proportional relationship between measurement, setpoint, and output. This is not true of a PID controller (proportional/integral/derivative) whose output will continue to integrate if there is any error between setpoint and measurement. While most controllers as discussed hereinafter are preferably of the PID type, in some instances it will be noted that a PIP type controller is preferable (i.e. for operation of voltage controller 72 with the generator connected to the electric power grid or power distribution network).

Rotor temperature computer 64 computes the temperature of the generator rotor based on rotor resistance. Resistance can be calculated from field current obtained from field current transducer 62 and from field voltage obtained from field voltage pick-up 66. Copper has a precise resistance-temperature relationship. Thus, an accurate determination of the temperature of the generator rotor is possible using this method because generator rotors normally employ a copper winding.

Rotor temperature limiter module 67 provides a limiting signal that effectively reduces field current to the generator rotor when the rotor temperature limiter determines the rotor temperature has become too high. Rotor temperature computer 64 provides a real time rotor temperature that is compared to a rotor temperature limit from rotor temperature limit module 68. The rotor temperature limit may be a constant limit temperature which is input by an operator or automatically input. The rotor temperature limit may be a variable limit which depends on ambient conditions, cooling system operation, or other factors which may affect the temperature limit at which the generator rotor may operate before damage occurs.

Excitation limit selector 70 provides a variety of high and low limiting values, which may vary, for limiting excitation demand signal from voltage controller 72 to field current controller 60. Limits are applied to excitation limit selector 70 from rotor temperature limiter 67, absolute excitation limit module 76, and the voltage controller 72 or manual controller 74. Either voltage controller 72 or manual controller 74 is applied to excitation limit selector 70; not both. The excitation demand signal from excitation limit selector 70 to field current controller 60 provides a setpoint which field current controller 60 compares to monitored field current as discussed hereinbefore. The excitation demand signal from voltage controller 72 is restricted according to the limits of excitation limit selector 70.

Absolute excitation limit module 76 provides minimum and maximum excitation limits for the excitation demand signal to field current controller 60. A minimum excitation limit, discussed hereinafter, (MNEL) (shown graphically in reactive capability diagrams of FIG. 4–13) prevents synchronous dropout due to under excitation. MNEL is clamped to zero during start-up. It is released to the normal setting for voltage matching prior to breaker closing. A maximum excitation limit (MXEL) protects the exciter and rotor from damage due to excessive excitation during transients. This feature normally limits excitation to a value of 120% of steady state requirements but allows over-excitation up to 150% for a short period (5 seconds) to help handle sudden load surges. After over-excitation, the system prohibits repeat over-excitation for a period dependent on the amount and duration of the over-excitation. This is referred to as inverse time over-excitation. Note that these values, like many other specific values discussed herein, are nominal and are adjustable in the system to suit each individual application.

Manual control module 74 allows direct operator control of excitation. This feature may be used for standard maintenance and as a troubleshooting aid during commissioning and tuning of the system. Manual control module 74 operates in conjunction with schematically indicated breakers 78 and 80, respectively, to avoid interference with excitation demand signal from voltage controller 72.

Voltage controller 72 modulates field current (through field current controller 60) to maintain generator output voltage. In power grid applications, the generator becomes tied to an essentially infinite grid and the generator has little effect on the overall voltage. The voltage controller preferably operates as a PIP (proportional/integral/proportional) type controller upon breaker closing because it cannot affect the voltage. A command for higher voltage would produce a proportional increase in excitation and more vars but no increase in voltage. If the controller were a PID type controller, it would continue to integrate an error it could not control and finally over-excite the generator. The setpoint or target of voltage controller 72 for control of the turbine generator after connection to the grid comes from var controller 82 as discussed hereinafter.

During start-up of the turbine generator of the present invention, and in isolated (i.e. not tied to a utility grid) applications, voltage controller 72 holds generator voltage output at a desired setpoint or target level. During start-up in non-isolated or power grid applications, the grid voltage becomes the setpoint or target level and voltage controller 72 matches generator output to grid voltage during synchronizing.

Volts per hertz limiter 84 restricts the target or setpoint signal to voltage controller 72 based on frequency or turbine speed. Generator and/or output transformer overload may be caused by over-fluxing in the event of a substantial drop in frequency while voltage controller 72 tries to maintain normal voltage. Volts per Hertz limiter 84 produces a reduction in generator output voltage as a linear function of frequency by reducing the setpoint or target of voltage controller 72. A time delay is preferably used to allow the system to respond to transient overloads before limiting is applied. Turbine speed detector 86 provides an output to volts per hertz limiter 84 to determine system frequency.

Soft start/stop limiter 88 coordinates generator functions with turbine functions during turbine generator start up and stopping. During start up, excitation current is held to zero by soft start/stop limiter 88 preferably until the turbine reaches 90% speed and field flashing is complete. Field flashing, which typically involves connecting a battery or other D.C. power source across the field, may be automatic or manual and is used to provide generator output when the generator has no residual field magnetism and thus would provide little output on start up. Once the turbine reaches 90% speed, the exciter is enabled with the minimum excitation limitation (MNEL) discussed hereinbefore. Soft start/stop limiter 88 then ramps MNEL until the voltage reaches the voltage setpoint which may typically be grid voltage or volts setpoint from either grid voltage detector 90 or volts setpoint module 92. "Soft" initialization of voltage control prevents destructive high voltage excursions that may occur if excessive excitation is applied during starting of the turbine generator.

Schematically illustrated breakers 94, 96, 98, and 100 may be software implemented if the signals they control are digitized. As discussed hereinbefore, the breakers may also be hardware implemented with manual or automatic regulation. The breakers are used to select which signal controls field excitation. For instance, if breaker 100 is closed and breaker 98 open, then the signal from var controller 82 exerts control over field current as the signal from var controller 82 passes through breaker 100 to proceed to other modules including voltage controller 72. Other combinations of operation for breakers 94, 96, 98, and 100 will provide a different target or setpoint signal to voltage controller 72 as indicated in FIG. 3.

Var controller 82 provides a setpoint or target for voltage controller 72 for operation of the control system of the present invention either in MVAR (mega-volt-ampere-reactive) or power factor priority mode as discussed hereinafter. Vars monitor 102 monitors var output and provides this as a comparison or monitored signal to var controller 82. A setpoint or target signal applied to var controller 82 from Vars setpoint module 83 prompts it to make any output changes necessary as compared to the monitored signal from vars monitor 102.

High var selector 104 provides a high select function to allow (leading) negative var limiter 106 to override negative MVAR demand in order to control stator temperature as discussed hereinafter with reference to reactive capability diagrams in FIG. 4–13. Negative (leading) var limit 106 controls stator temperature, when necessary, by raising field excitation through high var selector 104. As explained hereinafter, increasing field excitation current reduces negative vars and thereby protects stator coils.

Negative (leading) var limit controller 106 is disabled by priority control 108 if MVAR's (mega-volt-ampere-reactive) or PF (power factor) is selected as having high priority. Negative (Leading) var limiter 106 is also disabled when MVAR's are lagging or positive. A disabling signal connection is shown from priority control 108 to high var selector 104. The disabling function may also be implemented by disabling negative var limit control 106 directly or other suitable means. When MW are selected for high priority negative var limit controller 106 may reduce excitation until MVARs equals zero (PF=1.0) to optimize MW production.

Low var selector 110, positive (lagging) var limit controller 112, and priority control 108 co-operate in a similar manner as discussed with respect to negative var limit controller 106. Low var selector 110 provides a low select function to allow positive var limit controller 112 to override positive MVAR (mega-volt-ampere-reactive) demand for controlling stator temperature. Positive var limit controller 112 is disabled if MVARs or PF is selected for high priority. This module is also disabled if MVARs are negative. As with negative var limit controller 106, when MW are selected for high priority, positive (lagging) var limit controller 112 may alter excitation until MVARs equals zero (PF=1.0) to optimize MW production.

Megawatt limit controller 116 limits stator temperature by reducing turbine horsepower (and therefore MW). A stator temperature limit from stator temperature limit module 118 is typically set a few degrees above the setpoints or targets of positive and negative var limit controllers 112 and 106, respectively. This is indicated schematically by adder 120. By setting the temperature limit of megawatt limit controller 116 higher than that of controllers 112 and 106, MW limiting occurs only after MVARS have been reduced to zero (PF=1.0). Controllers 112 and 106 are enabled only when MW production has high control priority. The limit provided by stator temperature limit module 118 may be automatically provided or manually input.

Stator temperature monitor 122 preferably utilizes a plurality of temperature sensors embedded within the stator windings. The control system of the present invention then selects the highest good reading as the stator temperature. This sensor arrangement protects against the disadvantages of using general temperature monitors or use of ambient conditions to determine stator temperatures. Various parts of the stator coils may become more heated than other parts due, for instance, to dirt, cooling fan efficiency, and filter and duct conditions. Stator temperature monitor 122 applies its signals to temperature limit controllers 106, 112, and 116 for temperature limiting as necessary in comparison to a stator temperature limit provided by temperature limit module 118.

Var computer 124 computes MVAR's required for the desired power factor based on current megawatt production. The output from var computer 124 is used when power factor has high priority in the control system of the present invention. The power factor is equal to the cosine of the angle $\theta$ (theta) between the mvar vector and the real power vector. These vectors are indicated in the reactive capability diagrams in FIG. 4–FIG. 13. As the power factor approaches 1 ($\theta=0°$), direct reading of the power factor becomes difficult because the angle $\theta$ (theta) approaches zero degrees and minute changes in excitation can result in large non-linear changes in MVARs. Thus, the present invention preferably does not control power factor directly and does not measure it directly. Instead, the desired target power factor (setpoint) from Power Factor setpoint module 125 and the measured megawatts from MW monitor 127 are used to compute the MVARs necessary with the equation, $$MVAR\ MW \times Tan\ [\theta - Cos^{-1}(PF)]$$

MW monitor 127 may use a standard three-phase megawatt transducer to measure megawatts.

Power factor setpoint, Vars setpoint, and MW setpoint to respective modules 125, 83, and 134, are available from target control module 126. These setpoints or targets may be manually input or may automatically vary with time of day or other conditions as desired. For instance, a MW output target may be set to maximize MW output up to the turbine firing limit to provide for efficient turbine operation. The maximum MW output may vary as discussed hereinbefore due, for instance, to ambient temperature conditions.

Priority control module 108 operates in accordance with the table of FIG. 7 to provide high, low, and variable output component priorities as discussed hereinafter. Priority control module 108 operates schematic switches 128 and 130 to determine whether a vars setpoint or PF setpoint or target is transmitted to var controller 82. For instance, if PF has high priority, then priority control would close switch 128 and open switch 130. Priority control module may have priorities determined manually or the priorities may be programmed depending on anticipated loads, time of day, and other factors.

Turbine control module 132 operates in co-ordination with MW limit controller 116, and turbine sensor module 136 and MW setpoint module 134 to determine real power generated by the turbine in terms of turbine output horsepower. Thus, MW output will always meet the operator target unless the turbine runs out of horsepower as limited by turbine firing temperature (a function of turbine control 132) or by generator stator temperature (function of MW Limit Controller 116) Turbine sensor module 136 includes turbine sensors discussed previously such as turbine firing temperature sensors and the related sensor limits such as turbine firing limit temperature which is the maximum allowable turbine operating temperature.

Figure 4:
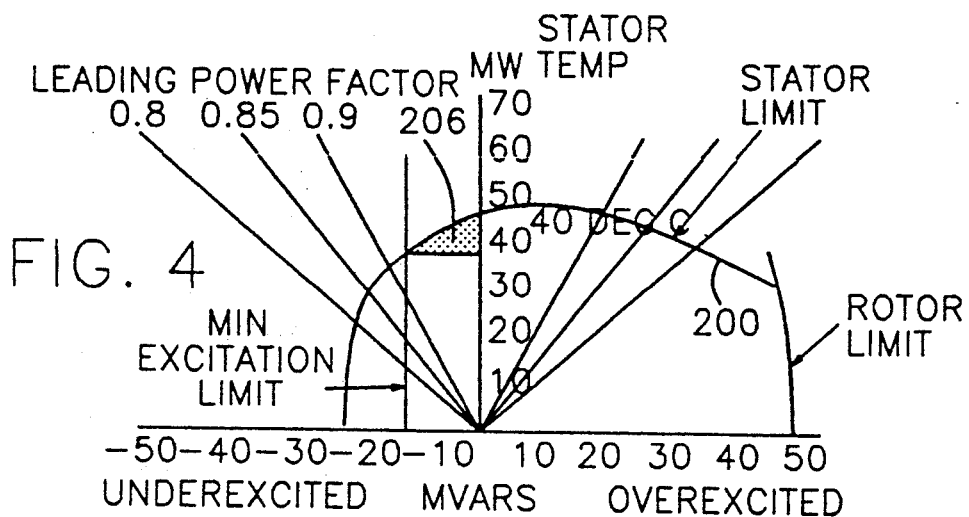
FIG. 4 is a reactive capability diagram for a generator showing an operation area in which the present invention limits negative MVAR's to control stator temperature in order to produce more MW.

Operation of the turbine generator control of the present invention is discussed with respect to FIG. 4–FIG. 13. FIG. 4 provides a generator reactive capability curve which shows combinations of MVAR's and MW that can overload the generator by producing damaging temperatures in stator and rotor windings. The point at which this overloading occurs is influenced significantly by ambient temperatures and the efficiency of the generator cooling system. Curve 200 in FIG. 4 indicates an ambient temperature of 40° C. for defining a limiting stator temperature. Other ambient temperatures would result in a different limit with lower ambient temperatures generally resulting in higher limits.

The control system of the present invention preferably uses information provided by rotor temperature computer 64 and stator temperature monitor 122. These determined temperatures provide more accurate generator protection than reliance on ambient temperature limits for MW and MVAR production. Cooling system variations may vary the stator temperature limit from that of curve 200 for an ambient temperature of 40° C. The minimum excitation limit is shown in the example to be less than approximately −14 MVARs. It should be clear that "−14 MVARs" and all other values are only arbitrary examples chosen for the purpose of discussion to provide understanding of the preferred embodiments of the present invention. Such values are nominal only and not fixed or to be interpreted in any manner as limitations of the present invention.

The minimum excitation limit determines the absolute lowest excitation current in order to prevent unstable generator operation and possible loss of synchronization with the grid. The minimum excitation limit is provided by absolute excitation limit module 76.

The shaded portion 206 of FIG. 4 indicates potential stator overload operation due to under-excitation for certain operating conditions. As an example, an ambient temperature of 40° C. and operation at −14 MVARs and 39 MW could produce excessive stator temperature. If Megawatts production has high priority and has a setpoint or target of 45 MW, then negative var limit controller 106 would limit minimum excitation by raising leading vars to approximately −10 MVARs to control stator temperature at the stator temperature limit. As noted hereinbefore, the stator temperature limit preferably is provided in the present invention by stator temperature limit module 118 rather than curve 200 shown in FIG. 4.

Figure 5:
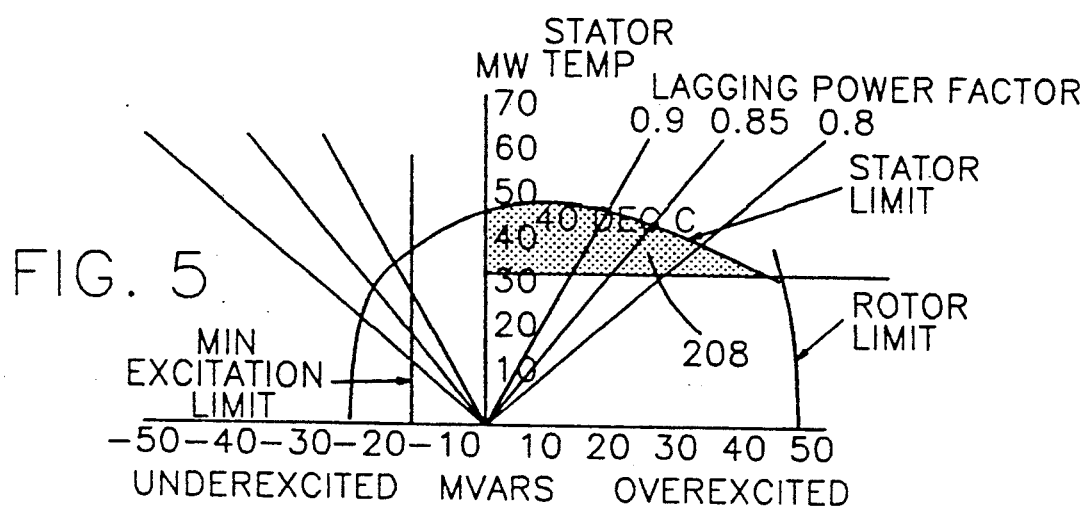
FIG. 5 is a reactive capability diagram for a generator showing an operation area in which the present invention limits positive MVARs to control stator temperature in order to produce more MW.

Shaded area 208 in FIG. 5 indicates where high stator temperatures will occur due to over-excitation past the indicated stator limits and with real power output above approximately 31 MW. In this mode of operation, high stator temperatures are caused by over-excitation rather than under-excitation as shown in FIG. 4. Assuming MW generation is the high priority output component, positive var limiter 112 will reduce vars to control stator temperature as necessary.

Figure 6:
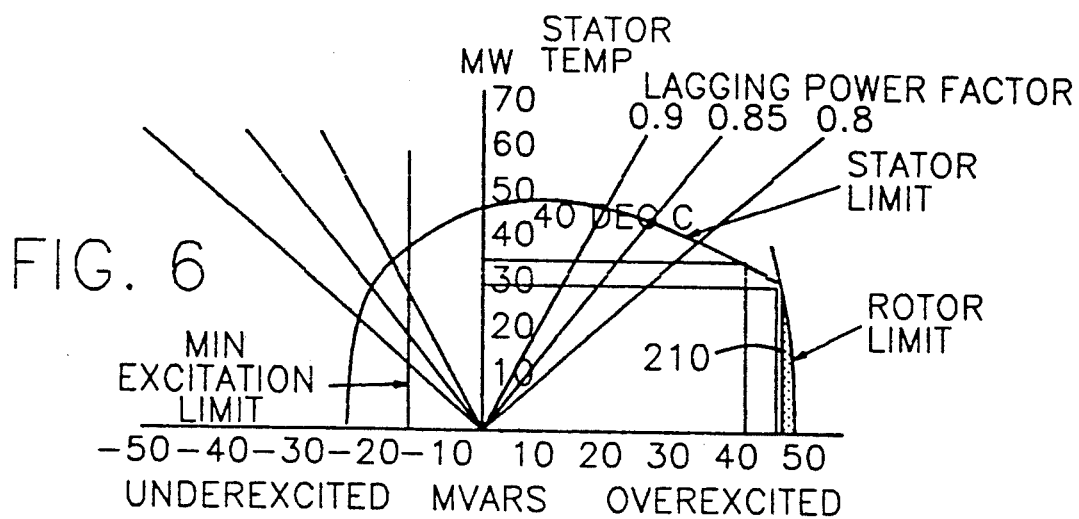
FIG. 6 is a reactive capability diagram for a generator showing a rotor overload area due to over-excitation.

Shaded area 210 in FIG. 6 illustrates the area in which high rotor temperature may occur. High field current can cause rotor heating and high rotor temperature substantially independently of stator conditions. In the example shown in FIG. 6, at 44 MVARs any operation above about 30 MW Will exceed the rotor capability. Regardless of which priority is selected, rotor temperature limiter 67 will limit excitation to control temperature. If the MW setpoint or target were raised to 35 MW and assuming MW output has high priority, the stator temperature would become limiting and positive var limit controller 112 would reduce excitation until var production dropped to about 39 MVAR. At this excitation, the rotor temperature would drop below the rotor temperature limit provided by rotor temperature limit module 68 and rotor temperature limiter 67 would cease to be active.

The chart of FIG. 7 provides the four main modes of operation of priority control module 108. As can be seen from the chart, the var limit controllers 106 and 112 are turned off when MVAR's or PF has high priority. Var limit controller 106 is also normally off when var limit controller 112 is on and visa versa. FIG. 8–13 provide illustration of operation of the control system of the present invention in terms of the chart of FIG. 7.

Figure 8:
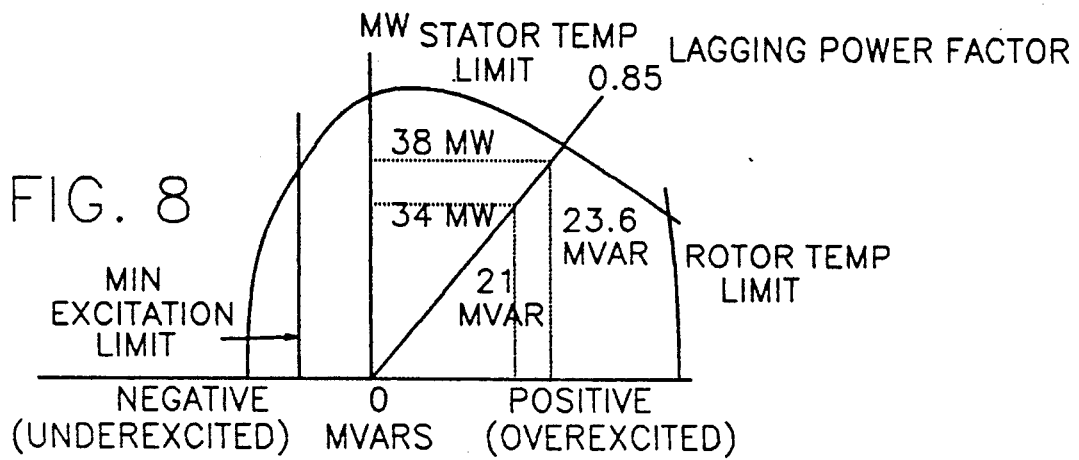
FIG. 8 is a reactive capability diagram representing control system operation in mode 1 of the chart of FIG. 7 for the case of high and low priorities being within turbine generator capability.

In mode 1, PF is the high priority output component. MW production is the low priority output component. MVAR production is the variable output component. As long as the turbine generator can meet the MW and PF setpoints by varying MVAR production, no excitation or turbine horsepower MW limiting occurs. This situation is illustrated in FIG. 8 where the PF setpoint is +0.85 and the MW setpoint or target requirement is 34 MW. This is within the generator and turbine capabilities so both requirements are met. If the MW setpoint is raised to 38 MW, the system will increase MVAR production to 23.6 MVARs to maintain a PF of +0.85. In this case, the targets are within the capability of the turbine generator and no limitations occur due to stator or rotor over-temperature.

Figure 9:
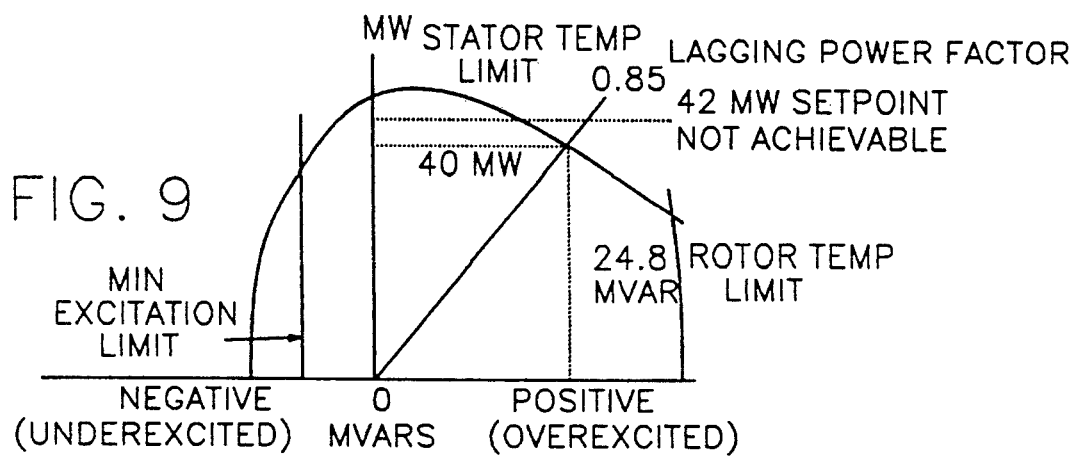
FIG. 9 is a reactive capability diagram representing control system operation in mode 1 of the chart of FIG. 7 for the case of low priority not being within the turbine generator capability.

Referring to FIG. 9, if the MW setpoint is raised to 42 MW, stator over-temperature will occur that prevents the targets from being within the capability of the turbine generator. In mode 1, neither var limit controller 106 nor 112 is enabled so Var controller 82 will continue to adjust MVAR production to hold the PF at the setpoint of +0.85. Thus, MW limit controller 116 will act through turbine control 132 to reduce turbine horsepower output to bring MW output production down to about 40 MW to prevent stator over-temperature.

Figure 10:
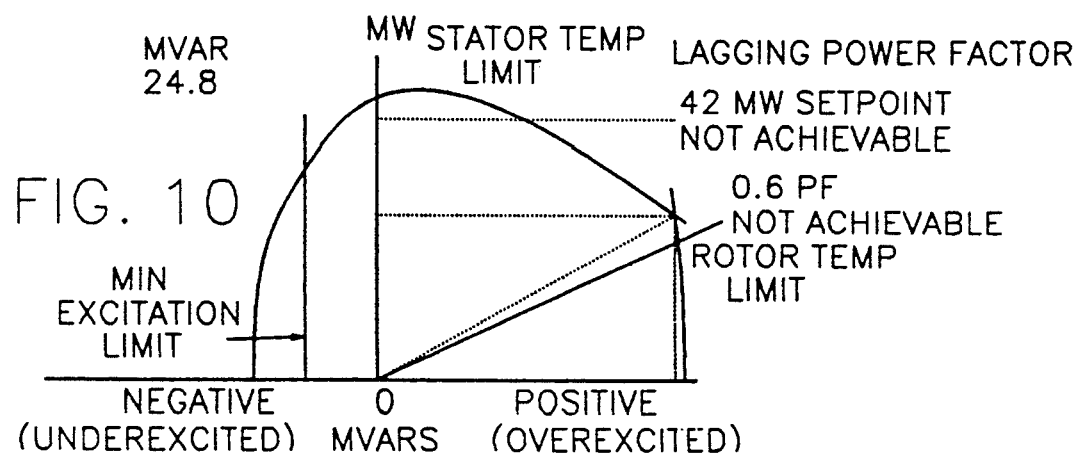
FIG. 10 is a reactive capability diagram representing control system operation in mode 1 of the chart of FIG. 7 for the case of high and low priorities not being within the turbine generator capability.

FIG. 10 illustrates a rotor over-temperature situation while operating in Mode 1. When PF and MW setpoints are set to values that result in rotor over-temperature, the PF priority target cannot be maintained. Rotor temperature limiter 67 overrides var controller 82 demand for excitation. MW limit controller 116 overrides MW demand in order to control stator temperature. Thus, the control system of the present invention results in protection of the generator while at the same time coming as close as possible to meet the PF and MW setpoints.

Figure 11:
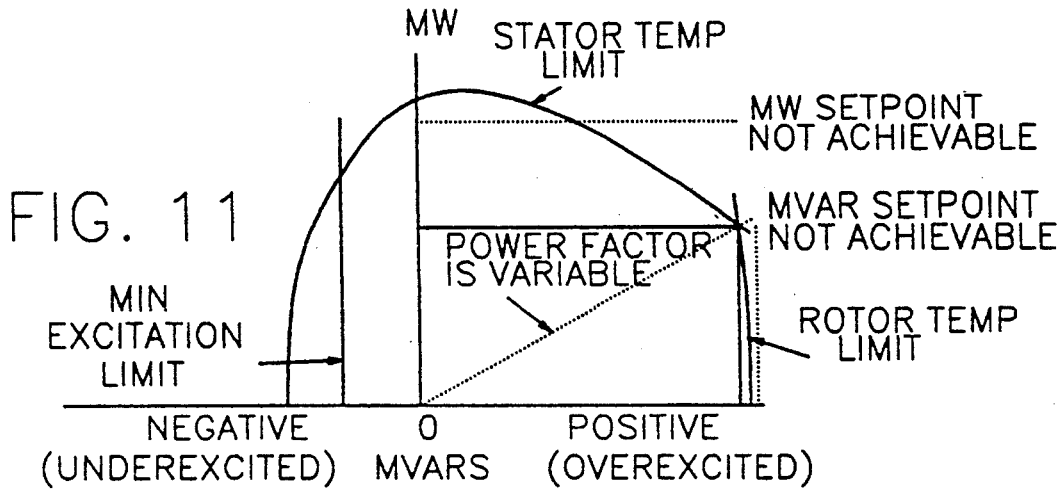
FIG. 11 is a reactive capability diagram representing control system operation in mode 2 of the chart of FIG. 7.

In mode 2 operation, which is discussed in connection with FIG. 11, MVAR output production has high priority and MW output production has low priority. The PF output component is variable. As long as the MVAR and MW targets are within the capability of the turbine generator, no excitation limiting or turbine MW limiting occurs. If a stator over-temperature occurs, MW limit controller 116 will override turbine output to control it. This control strategy allows maximum possible MVAR production up to the rotor temperature limitation and then limits MW production to control stator temperature.

Figure 12:
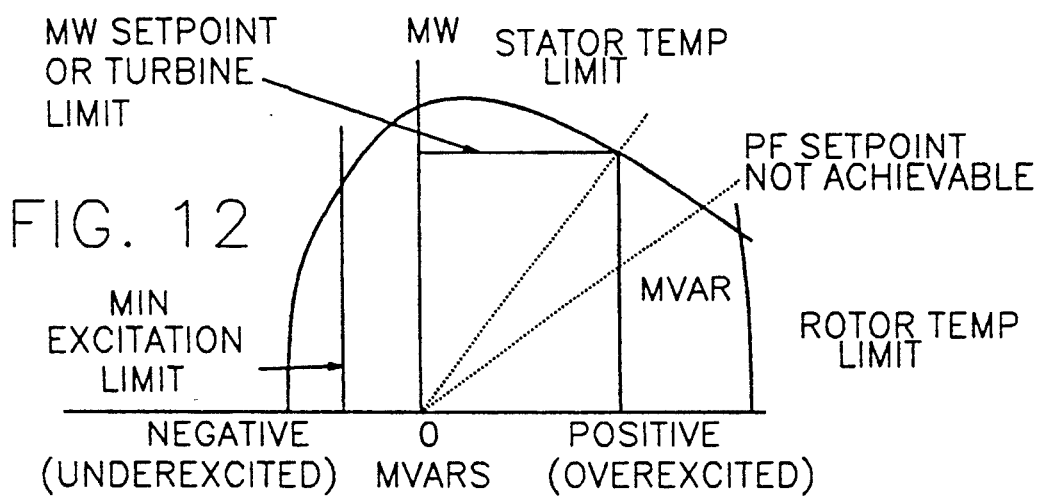
FIG. 12 is a reactive capability diagram representing control system operation in mode 3 of the chart of FIG. 7.

FIG. 12 illustrates mode 3 operation. MW production is the high priority generator output component. PF is the low priority output component. The MVAR output component is variable. As long as the MW and PF setpoints are within the limitations of the turbine generator, no excitation or MW limiting occurs. If the combination of MW and PF results in high rotor or stator temperatures, then excitation will be limited and the PF setpoint will not be met. Thus, in the case illustrated, positive var limit controller 112 limits MVAR production to protect the generator while still producing the required MW.

As Well, if the turbine reaches a horsepower limit such as the gas turbine firing limit, turbine control 132 may reduce MW output to protect the turbine. If the turbine capacity (horsepower) is greater than generator capacity even at 0.0 MVAR production, then MW limit controller 116 overrides turbine MW production target to protect the generator. This condition sometimes occurs if gas turbine "Max Peak" load is selected for target control 126 and ambient temperatures are very low resulting in higher turbine capability. If ambient temperature is low, then the air is denser and a greater mass of air will be compressed by the turbine compressor. This means more fuel can be admitted before the firing temperature reaches its limit. This greater quantity of air and fuel results in greater turbine horsepower output. The greater turbine horsepower output might or might not be at a higher efficiency (e.g. MW per BTU).

Figure 13:
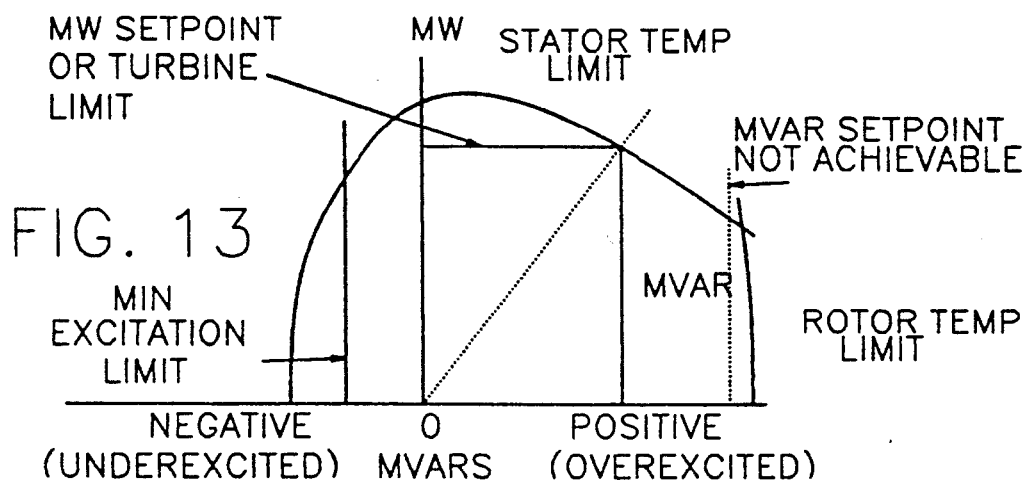
FIG. 13 is a reactive capability diagram representing control system operation in mode 4 of the chart of FIG. 7.

Mode 4 operation is illustrated in FIG. 13. In this mode of operation MW output has high priority. MVAR output has low priority and PF is the variable output component. As long as the machine can meet both MW and MVAR production within its limits, no excitation or MW limiting occurs. If the combination of MW and MVAR targets or setpoints results in high rotor or stator temperatures, then excitation will be limited and the MVAR setpoint will not be met. Thus, MVAR output is reduced to protect the generator while still producing the required MW demand. This mode of operation is common in peaking gas turbine applications. The aim is to generate maximum MVARs up to the generator capability, while at the same time producing maximum MW up to the turbine firing temperature limit.

The foregoing disclosure and description of the invention is provided for illustrative and explanatory purposes, and it will appreciated by those skilled in the art, that various changes may be made in the features of the control apparatus and method of the present invention as disclosed in the schematics and discussion thereof without departing from the spirit of the invention.

What is claimed is:

1. A control apparatus for a turbine generator, comprising:
   priority selection means for selecting a high priority output component, a low priority output component, and a variable output component from output components including real power generated, power factor, and reactive power generated;
   setpoint selection means for selecting a setpoint for said high priority component and said low priority component;
   a generator rotor for producing a rotating magnetic field;
   a field current controller for regulating field current in said generator rotor; and turbine control means for controlling turbine horsepower, said turbine control means being responsive to said setpoint selection means and said priority selection means with respect to said real power generated output component.

2. The control apparatus of claim 1, further comprising:
stator temperature means for measuring stator temperature,
reactive output limiter means responsive to said stator temperature for limiting reactive power output by altering field current with respect to said field current controller,
said turbine control means being responsive to said stator temperature for limiting real power output by reducing turbine power, and
means for disabling said reactive output limiter means responsive to said priority selection means.

3. The control apparatus of claim further comprising:
rotor temperature limiting means responsive to the temperature of said generator rotor, said rotor temperature limiting means restricting said field current controller operation by limiting field current when said temperature of said generator rotor reaches a rotor temperature limit.

4. The control apparatus of claim further comprising:
a reactive output controller for altering field current from said field current controller, said reactive output controller being responsive to said priority selection means and said setpoint selection means.

5. The control apparatus of claim 4, wherein:
said reactive output controller is responsive to said priority selection means and said setpoint selection means for said power factor output component and said reactive power output component.

6. The control apparatus of claim 5, further comprising:
stator temperature means for measuring stator temperature,
lagging reactive power limiter means responsive to said stator temperature means, and
a leading reactive power limiter means responsive to said stator temperature means, said leading and lagging reactive power limiter means restricting operation of said reactive output controller.

7. A control method for a turbine generator comprising the following steps:
selecting an operation mode for said turbine generator, said operation mode having a high priority output component, a low priority output component, and a variable output component selected from output components including real power generated, power factor, and reactive power generated;
selecting an output setpoint for said high priority output component and said low priority output component;
said high priority and low priority output components for producing said high priority and said low priority output setpoints while allowing said variable output component to vary;
determining if said high priority output setpoint and said low priority output setpoint are within the capability of said turbine generator;
varying said low priority output component to produce said high priority output setpoint when said high priority setpoint and said low priority output setpoint are not within the capability of said turbine generator;
determining if said high priority output setpoint is within the capability of said turbine generator; and
varying said high priority output component when said high priority output setpoint is not within the capability of said turbine generator.

8. The control method of claim 7, further comprising:
determining stator temperature,
ascertaining if stator temperature is within the capability of said turbine generator, and
reducing stator temperature when stator temperature is not within the capability of said turbine generator by selecting either a decrease in turbine horsepower output or a change in field current, said selection of either a decrease in turbine horsepower output or a change in field current being dependent on said operation mode.

9. The control method of claim 7, further comprising:
determining rotor temperature,
ascertaining if rotor temperature is within the capability of said turbine generator, and
overriding said operation mode by varying the magnitude of field current when said determined rotor temperature is not within the capability of said turbine generator.

10. The control method of claim 9, further comprising:
measuring rotor voltage,
measuring rotor current, and
calculating rotor temperature from said measured rotor voltage and said measured rotor current.

11. The control method of claim 7, further comprising:
determining turbine firing temperature, and
comparing said determined turbine firing temperature with a maximum firing temperature limit.

12. The control method of claim 7, further comprising:
selecting real power generated as said low priority output component,
measuring stator temperature,
determining if said stator temperature is within the capability of said turbine generator, and
reducing real power generated when said stator temperature is not within the capability of said turbine generator responsive to said step of selecting real power as said low priority output component.

13. The control method of claim 7, further comprising:
measuring megawatts generated,
selecting a desired power factor setting,
calculating reactive power generated utilizing said desired power factor and said measured megawatts generated.

14. The control method of claim 7, further comprising:
selecting real power generated as said high priority output component,
measuring stator temperature,
determining if said measured stator temperature is within the capability of said turbine generator,
selecting to vary field current to limit the magnitude of reactive power generated responsive to said step of selecting real power generated as said high priority output component when said measured stator temperature is outside the capability of said turbine generator.

15. The control method of claim 7, further comprising,
   selecting real power generated as said high priority output component,
   measuring stator temperature,
   determining if said measured stator temperature is within the capability of said turbine generator,
   varying field current to reduce the magnitude of reactive power generated as necessary up to a limit of approximately zero when said measured stator temperature is outside the capability of said turbine generator, and
   after said step of varying field current has reduced the magnitude of said reactive power generated to a limit of approximately zero then limiting the magnitude of said real power generated when said measured stator temperature is outside the capability of said turbine generator.

16. The control method of claim 7, further comprising:
   measuring stator temperature, and
   comparing said measured stator temperature with a stator limit temperature to determine if said low or high priority output setpoint is within the capability of said turbine generator.

17. The control method of claim 16, further comprising:
   taking the maximum temperature from a plurality of stator temperature sensors for said measured stator temperature.

18. A control method for a turbine generator, comprising the following steps:
   selecting real power generated as a high priority output component for said turbine generator;
   selecting reactive power generated as a low priority output component for said turbine generator;
   selecting power factor as a variable output component for said turbine generator;
   selecting a real power generated setpoint and a reactive power generated setpoint;
   controlling said real power generated and said reactive power generated while allowing said power factor to vary for producing said real power generated setpoint and said reactive power generated setpoint;
   determining if said real power generated setpoint and said reactive power generated setpoint are within the capability of said turbine generator;
   reducing the magnitude of said reactive power generated when said real power generated and said reactive power generated are not within the capability of said turbine generator.

19. The control method of claim 18, further comprising:
   setting the real power generated setpoint so the turbine will produce the maximum real power up to the turbine firing temperature limit.

20. The control method of claim 19, further comprising:
   determining rotor temperature,
   ascertaining if rotor temperature is within the capability of said turbine generator, and
   overriding said reactive power output setpoint by varying the magnitude of field current when said determined rotor temperature is not within the capability of said turbine generator.

21. A control method for a turbine generator, comprising the following steps:
   selecting real power generated as a high priority output component for said turbine generator;
   producing maximum megawatt output for said real power generated up to the turbine firing temperature limit;
   selecting reactive power generated as a low priority output component; and
   controlling excitation to produce maximum MVAR output up to generator capacity while still producing said maximum megawatt output up to the turbine firing temperature limit.

22. The control method of claim 21, wherein:
   said step of controlling excitation includes varying excitation to reduce stator temperature below a stator temperature limit.

23. The control method of claim 21, wherein:
   said step of controlling excitation includes varying excitation to reduce rotor temperature below a rotor temperature limit.

* * * * *

UNITED STATES PATENT AND TRADEMARK OFFICE
CERTIFICATE OF CORRECTION

PATENT NO. : 5,321,308
DATED : June 14, 1994
INVENTOR(S) : Allan W. Johncock

It is certified that error appears in the above-indentified patent and that said Letters Patent is hereby corrected as shown below:

In column 13, line 59, insert --controlling-- before "said".

Signed and Sealed this

Twentieth Day of September, 1994

Attest:

BRUCE LEHMAN

Attesting Officer

Commissioner of Patents and Trademarks